US007664674B2

(12) United States Patent
Negron

(10) Patent No.: US 7,664,674 B2
(45) Date of Patent: Feb. 16, 2010

(54) SUPPLY CHAIN AND INVENTORY RISK MANAGEMENT SYSTEM

(75) Inventor: Richard J. Negron, Roswell, GA (US)

(73) Assignee: United Parcel Service of America, Inc., Atlanta, GA (US)

(*) Notice: Subject to any disclaimer, the term of this patent is extended or adjusted under 35 U.S.C. 154(b) by 1079 days.

(21) Appl. No.: 10/256,652

(22) Filed: Sep. 27, 2002

(65) Prior Publication Data
US 2004/0064382 A1 Apr. 1, 2004

(51) Int. Cl.
*G06Q 40/00* (2006.01)
(52) U.S. Cl. .......................................... 705/26; 705/28
(58) Field of Classification Search ................... 705/26, 705/28, 22, 8, 10
See application file for complete search history.

(56) References Cited

U.S. PATENT DOCUMENTS

| | | | | |
|---|---|---|---|---|
| 5,063,507 A | * | 11/1991 | Lindsey et al. | 705/26 |
| 5,237,496 A | * | 8/1993 | Kagami et al. | 705/10 |
| 5,970,475 A | * | 10/1999 | Barnes et al. | 705/27 |
| 6,405,178 B1 | * | 6/2002 | Manchala et al. | 705/29 |
| 6,430,540 B1 | * | 8/2002 | Guidice et al. | 705/28 |
| 6,453,255 B1 | * | 9/2002 | Smorodinsky et al. | 702/81 |
| 6,764,004 B2 | * | 7/2004 | White | 235/385 |

FOREIGN PATENT DOCUMENTS

EP       1 255 214 A2 * 6/2002 ................... 705/28

OTHER PUBLICATIONS

Farnsworth on Contracts pp. 124-129 (1998).*
Williston on Contracts pp. 875-880; 1002-1004.*

* cited by examiner

*Primary Examiner*—Elaine Gort
(74) *Attorney, Agent, or Firm*—Alston & Bird, LLP

(57) ABSTRACT

A system and method for supply chain and inventory risk management that supplies inventory from a manufacturer to a plurality of customers. An owner entity of the system is transferred a plurality of customer agreements which describe requirements for the distribution of the inventory to the customers in agreed-upon amounts in exchange for agreed-upon payments. Transfer of the customer agreements allows an electronic system of the owner entity to forecast and place orders purchasing from the manufacturer the amount of inventory that will be needed by the customers. Further, the transfer of the agreements increases the certainty that inventory purchased by the owner will be sold to the customer. The electronic owner system may also commission the services of a logistics agent that is capable of providing shipping and handling services customized to high-risk inventory, such as electronic components, increasing the owner's profit on the sale of the inventory.

19 Claims, 3 Drawing Sheets

SUPPLY CHAIN AND INVENTORY RISK MANAGEMENT SYSTEM

BACKGROUND OF THE INVENTION

1. Field of the Invention

The present invention is directed to the use of supply chain management system, and in particular, supply chain management systems for high-risk inventory goods that are prone to damage, depreciation in value and obsolescence.

2. Description of Related Art

Manufacturing companies often must carry considerable inventory when goods go unsold due to insufficient demand, or when goods are stockpiled in anticipation of future demand. Such excess inventory tends to tie up valuable capital and is expensive to store and manage. Excess inventory can also have a negative effect on the manufacturing company's balance sheet which depresses its stock price and increases its borrowing costs. Further, the inventory itself may be subject to the risks of obsolescence and damage during handling. Manufacturing companies are also affected by carrying excessive accounts receivable. Accounts receivable are unpaid bills for manufactured goods that have been shipped to and accepted by a customer. Obviously, unduly large accounts receivable can depress the cash flow necessary for the company to survive and will eventually erode company profits.

Factoring is a business method that has been developed to remove the accounts receivable from a manufacturer's balance sheet. Factors purchase accounts receivable at a discount to their present value. The discount serves as consideration for assuming the risks associated with collection on the accounts. In one example, a farmer ships a load of grain to a customer with an invoice and the customer accepts the delivery. The farmer then submits the invoice to the factor in return for an initial payment equal to a percentage of the invoice, such as 80%. The factor then undertakes collection on the invoice and once receiving payment from the customer forwards the balance of the invoice payment, minus factoring fees, to the farmer.

Securitization is a business method that has been developed to remove inventory from the balance sheet without adding to accounts receivable. Securitization is the process of separating inventory from a balance sheet by using the inventory as collateral for the issuance of securities. The securities are then rated and sold based upon the economic value of the underlying assets. The manufacturer receives the majority of the proceeds from the sale of the securities and is alleviated of the risks associated with its inventory of goods. Securitization has been used for such goods as grain, steel and even champagne.

Securitization and factoring, however, have limited usefulness for high-risk inventory goods. One example of high-risk inventory goods are electronic components used to assemble computers and other electronic retail products. Electronic components are often specialized to the needs of a few customers and cannot be readily sold on open exchanges due to a lack of potential purchasers. In addition, electronic components may quickly become obsolete due to constant improvements in competing products and/or changes in compatibility requirements of new electronic systems. Electronic components also have special handling requirements because the components are typically prone to damage from rough handling or adverse environmental conditions such as dust and heat.

In sum, high-risk inventory goods include goods that are not fungible, that are prone to obsolescence or that have special handling requirements. Goods that are prone to obsolescence, such as the above-described electronic components, tend to depreciate rapidly leaving little time for a factor to arrange for financing, or for the valuation and issuance of securities. Also, the high inventory risks introduce uncertainty as to the sale price that can be obtained for the goods. As a result of such uncertain future value, factors and potential note purchasers will demand a much larger discount on the present value of the goods than they would for most commodities. A manufacturer faced with increasing discounts on the current value of its inventory is much less likely to resort to factoring or securitization.

Beyond problems associated specifically with high-risk inventory goods, securitization transactions have been challenged during bankruptcy proceedings. The stock or bonds that are issued during securitization represent the inventory as an entity separate from the manufacturer which is sometimes referred to as a special purpose vehicle, or SPV. Ostensibly, the SPV is inaccessible during bankruptcy proceedings against the manufacturer. However, debtors may try to attack securitizations during bankruptcy proceedings under the theory that the transactions are not "true sales" of the inventory goods. Part of the reasoning of such attacks is that the inventory goods are still under the physical control of the manufacturer, even after the securities have been issued. Doubt about the effectiveness of the SPV in isolating the inventory goods from bankruptcy proceedings can reduce the value of the SPV.

Therefore, it would be advantageous to have a system that allows for the removal of high-risk inventory goods, such as goods prone to obsolescence or having special handling requirements, from the balance sheet of a manufacturer. It would be further advantageous if the goods were removed from the manufacturer's balance sheet using a true sale to a separate entity unlikely to be challenged during a bankruptcy proceeding. It would also be advantageous if the value of the inventory could be ensured for the manufacturer despite its high risk characteristics.

BRIEF SUMMARY OF THE INVENTION

The present invention addresses the above needs and achieves other advantages by providing a system and method for supply chain and inventory risk management that supplies inventory manufactured by a manufacturing entity to a plurality of customers. The system includes an owner entity that is transferred a plurality of customer agreements which describe requirements for the distribution of the inventory to the customers in agreed-upon amounts in exchange for agreed-upon payments. Transfer of the customer agreements allows the owner entity to forecast the amount of inventory that will be needed by the customers and increases the certainty that inventory purchased by the owner will be sold to the customers. The owner entity may also include a logistics agent that is capable of providing customized shipping and handling services. The combination of customer agreements and customized logistics services maximizes the value of the inventory, and particularly high-risk inventory such as electronic components, that are non-fungible, fragile, environmentally sensitive and prone to obsolescence, to both the owner entity and the manufacturer.

In one embodiment, the present invention includes a supply chain and inventory risk management system for supplying inventory manufactured by a manufacturing entity to a plurality of customers. Included in the system are a plurality of customer agreements between the manufacturer and the customers. The customer agreements require distribution of the inventory to the customers in agreed-upon amounts for agreed-upon payments per inventory unit. An owner entity is also included in the management system and is capable of being transferred the customer agreements. Using the agreed-upon amounts of inventory from the customer agreements, the owner entity forecasts the amounts of the inventory needed to supply the customers. The owner entity is also capable of taking title to the forecasted amounts of inventory from the manufacturer in exchange for payment. Additionally, the owner entity is capable of distributing the agreed-upon amounts of the inventory in accordance with the customer agreements and of receiving the agreed-upon payments from the customers in return for the inventory.

The customer agreements may also include terms defining the timing of the inventory distribution by requiring delivery at agreed-upon times. Such agreed-upon times are used by the owner entity to further forecast the timing of inventory purchases from the manufacturer. Typically, the forecasted timing of the purchases from the manufacturer will be less frequent than the agreed-upon purchase times by the customer. In addition, the forecasted purchase amounts of inventory are greater than the agreed-upon amounts as each forecasted purchase order includes a plurality of customer orders over a period of time.

In another aspect, the system may include a financing entity that creates the owner entity and funds the owner entity to provide it with funds for the purchase of the inventory. For instance, the financing entity may create a subsidiary corporation or company to which it directly lends funds or from which it purchases stock to supply it with funds.

In still another aspect, the owner entity may partner with, or create, a logistics agent as part of the management system. For instance, the logistics agent may be a commercial package carrier capable of managing distribution of the inventory to the customers. Other services may also be provided by the logistics agent beyond delivery, including freight forwarding, or import and export brokerage services. The shipping logistics agent may also facilitate visibility of the supply chain by providing reporting or tracking services.

The management system may optionally include a hub in geographical proximity to the customer for the convenience of the customer. At the hub, the owner entity takes physical possession of the inventory purchased from the manufacturer, such as by receiving the inventory when delivered by the logistics agent. If necessary, the inventory may be stored at the hub for later distribution. Physical possession at the hub may be accompanied by transfer of title to the inventory as defined by the agreements or standard course of dealings between the manufacturer and owner.

The management system is most useful when employed to purchase and distribute high-risk inventory under the preexisting customer agreements. High-risk inventory includes goods that are fragile and damage prone, prone to obsolescence, perishable, sensitive to adverse environmental conditions or customized to the needs of specific customers. Electronic components are one example of inventory that has nearly all of these characteristics.

In yet another aspect, the customer agreements may include forecasts of customer sales and purchase orders submitted by the customers. The owner entity uses the sales forecasts to forecast its purchases of inventory from the manufacturer over the long term, while the purchase orders can be used to forecast short-term purchases of inventory from the manufacturer. Further, the purchase orders may include cancelable purchase orders and non-cancelable purchase orders. When determining short-term customer needs, the owner entity determines minimum fulfillment rates and periods using the non-cancelable purchase orders.

For the manufacturer, the inventory risks, the risks of non-performance of the agreements and non-payment by the customer, and the risks of short-term market price fluctuation of the inventory are shifted to the owner. For the owner, certainty is added to the demand for inventory goods, and the prices paid for those goods, through the transfer of customer agreements to the owner. In this manner, the owner is able to manage the inventory and maximize its return on the inventory, thereby allowing the owner to pay higher prices for the inventory purchased from the manufacturer. This is especially true for high-risk inventory which may be non-fungible, such as by being custom manufactured, and therefore not easily sold on open exchanges if not purchased by the customer. Instead, the customer is bound by the agreements to purchase the inventory goods, increasing the likelihood of purchase of the inventory and providing recourse to the owner if the goods are not purchased. The use of a proximity hub, and the logistics agent to manage the hub, ensures that the particular handling needs of the high-risk inventory are met to minimize breakage or obsolescence, further maximizing the amount and value of the inventory sold by the owner.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
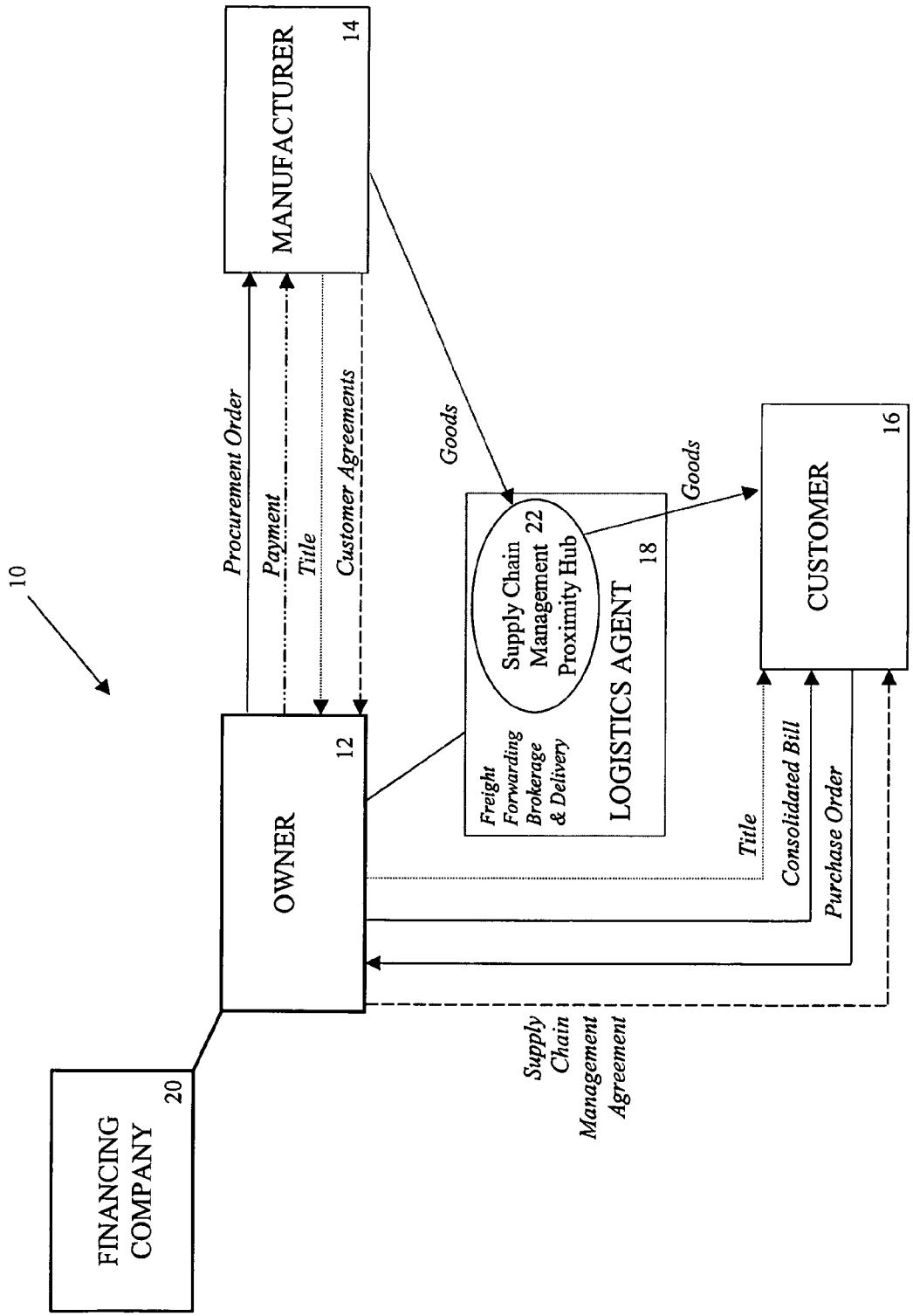
FIG. 1 is a schematic of a supply chain and inventory risk management system of one embodiment of the present invention.

A supply chain and risk management system 10 of one embodiment of the present invention is shown in FIG. 1 and includes an owner entity ("owner") 12 that takes title to inventory goods manufactured by a manufacturing entity ("manufacturer") 14 and supplies the inventory goods to a customer 16. Optionally, the owner can employ a logistics agent 18 to facilitate supply chain management and a financing entity 20 may provide funds for the purchase of the inventory goods from the manufacturer 14.

The term "entity" as used herein may refer to a partnership, corporation, limited liability company, sole proprietorship, firm or some other real or fictional person, or a collection of such real or fictional persons, capable of possessing title to the inventory. As used herein, the term "manufacturer" can refer to one or a number of entities, corporate and otherwise, that are a source for the inventory goods purchased and distributed by the owner 12. The manufacturer 14 may add value to the inventory by production or assembly, or may merely be a distributor of the goods from an upstream manufacturer. However, in a preferred embodiment the manufacturer physically produces the goods from raw materials, or otherwise adds value to the goods, but wishes to avoid the expense and difficulties of supply chain management, especially the expense and difficulties associated with high-risk inventory goods.

High-risk inventory goods include goods that are not fungible, that are prone to obsolescence or that have special handling requirements. Preferably, the high-risk inventory managed and distributed by the owner 12 includes electronic components used to construct computers such as complex circuit boards, application specific integrated circuits, capacitors, resistors, plastics and system enclosures. As described in the background section, such electronic components are often specialized to the needs of a few, specific customers 16 and cannot be readily sold on open exchanges due to a lack of potential purchasers. In addition, electronic components may quickly become obsolete due to constant improvements in competing products and/or changes in compatibility requirements of new electronic systems. Electronic components also have special handling requirements because the components are typically prone to damage from rough handling or adverse environmental conditions such as dust and heat. Other types of high-risk goods could also be distributed using the management system 10, such as produce (which is perishable), or even regular goods such as automotive parts.

Preferably, the manufacturer 14 of the goods has preexisting customer supply agreements with the customer 16. Optionally, the customer agreements may be formed between the manufacturer 14 and the customer 16 subsequent to formation of the owner 12. Such customer agreements include purchase orders, forecasts, contractual and non-contractual agreements, and other relationships, with the customer. Further, the manufacturer 14 should be able to identify additional, prospective customers and transfer such information as part of the customer agreements to the owner 12. Upon transfer, the owner is expected to continue to fulfill the responsibilities previously fulfilled by the manufacturer 14, including adhering to the pricing of the inventory units and other terms and conditions of the customer agreements.

The customer 16 is preferably a retailer or producer of consumer goods which it orders as bulk inventory from the manufacturer 14 originally, and then from the owner 12 once the agreements have been transferred. For instance, the customer 16 could be a computer retailer that sells computers or kits of spare parts using components partially supplied by the manufacturer 14 via the owner 12. Alternatively, the customer 16 could be another distributor that further distributes the inventory to other distributors or retailer. Further, the customer could also be an individual consumer placing direct orders for the computer components over the Internet.

The owner 12, as illustrated in the embodiment of FIG. 1, is preferably an entity separate from the manufacturer 14 that is created by the financing entity 20 for the express purpose of receiving transfer of the customer agreements and for purchasing and distributing the inventory goods. The financing entity 20 may be a bank, or capital investment arm of a corporation, or any entity with sufficient capital to fund purchase of inventory by the owner 12. Preferably, the owner is a corporation that transfers stock to the financing entity 20 in return for funds thereby becoming a subsidiary of the financing entity. In another alternative, the financing entity 20 may extend credit to the owner 12 for the purchase of the goods. Other methods of funding may also be used and still accomplish the objective of enabling the owner to purchase the inventory, but are known to those of skill in the art and are therefore not discussed herein in further detail.

In addition to taking title to the inventory goods, the owner 12 is also responsible for managing the inventory supply chain to ensure fulfillment of supply obligations under the customer agreements. For this purpose, the owner preferably partners, creates, or otherwise affiliates itself with the logistics agent 18, as shown in FIG. 1. The logistics agent must be capable of providing distributions services, including, but not limited to, packaging, shipping, freight forwarding, brokerage services (import and export) and various other transportation services. As an example, the logistics agent may be a commercial carrier or package delivery service that has preexisting facilities (trucks, aircraft, warehouses, etc.) for handling, storing, packaging and delivering freight or packages. In such an example, the logistics agent would be responsible for securing, warehousing and all inventory management activities related to the owner 12's inventories. In another option, the logistics agent 18 preferably can provide supply chain visibility to the manufacturer 14 or customer 16 through the use of reporting, inventory accounting and tracking services. In still other options, the logistics agent 18 may process returns by the customer, assemble and package kits of inventory, such as kits of spare electronics parts, repair damaged goods, and provide quality control services, such as diagnostic testing of electronic parts, for the customer.

Still another option, shown in the embodiment illustrated in FIG. 1, the owner 12 may also provide a proximity hub 22 to facilitate supply chain management. For instance, the proximity hub may include a warehouse, or other storage, packing and delivery site at a location convenient for the customer for holding the inventory until customer orders must be fulfilled. The hub may be customized for the management of high-risk goods, such as containing clean rooms for the storage of electronics or refrigerators for storage of produce. In a particularly advantageous arrangement, the owner 12 could contract with the logistics agent 18 to use its preexisting facilities as the proximity hub 22. If the logistics agent 18 already maintains some inventory for the manufacturer 14 or customer 16 at the hub 22, such as for another owner, the logistics agent is responsible for physically separating the inventories, such as by identifying, separating and holding the inventories behind locked fencing. Preferably, title to the inventory passes from the manufacturer 14 to the owner 12 when physically delivered to the hub 22 by the logistics agent 18. In another alternative, the hub may not be in proximity to the manufacturer 14 but is selected for the convenience of the owner 12 or the customer 16.

Preferably, the customer agreements have specific cost provisions to lend additional certainty to the price paid for the inventory by the customer 16. For instance, the price paid may include a per unity product cost, a per unit packaging fee, a per unit screening fee, a hub service fee and a per unit holding fee. For kits of spare electronic parts, the per unit product cost is the average cost of the spares kits and the expense incurred to repair the products if damaged. The packaging fee is the per unit fee for packaging materials. Screening fees are the costs attendant to ensuring that the electronic components are functioning properly. The hub service fee includes warehousing of the inventory, including any returns by the customer, and labor costs. Various labor costs include costs for kitting, inventory level maintenance, production scheduling and planning, product procurement, relationship management under OEM warranties and quality control services. The per unit holding fee includes interest rate calculations for the outstanding balance on borrowed funds for purchasing the inventory.

Figure 2:
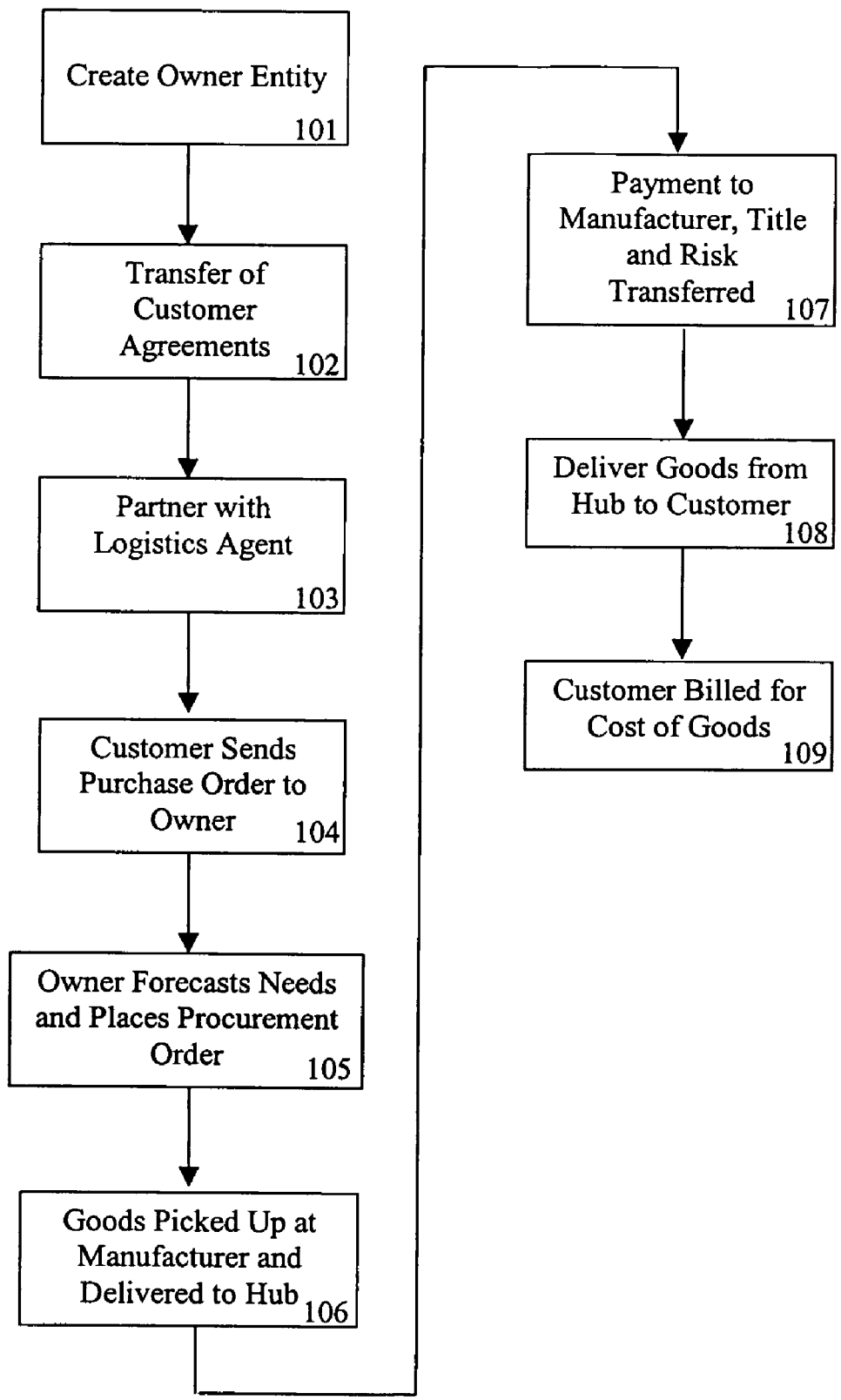
FIG. 2 is a flow diagram of a supply chain and inventory risk management method of another embodiment of the present invention.

During operation of the supply chain and inventory risk management system 10, illustrated as one preferred embodiment in FIG. 2, the financing entity 20 in step 101 forms a subsidiary in the form of the owner 12. As discussed above, the owner could be formed as a corporation with a stock sale to the financing entity 20 so as to provide funds for purchases of inventory.

In step 102, the manufacturer 14 assigns the customer agreements to the owner 12 and the customer 16 assigns title to the current goods in its inventory in return for payment from the owner company 12. If not included in the original customer agreements, the owner forges a supply chain management agreement with the customer. Included in the supply chain management agreement are provisions to provide the logistics services and support required to maintain the proximity hub 22 facility in a location desired by the customer. Other logistics services include freight forwarding, import/ export brokerage and delivery services for moving the goods from the manufacturer to the hub and the hub to the customer.

The owner company 12 in step 103 forges an agreement with the logistics agent 18 (or forms its own logistics agent) to manage the logistics services. The logistics agent is preferably a separate entity experienced in the delivery, storage and other handling of goods, such as a package delivery company. The logistics agent further preferably provides reporting, tracking and inventory visibility of the goods. Once the relationships are established, the system is employed to supply the customer 16 with the goods and to minimize inventory costs on the customer and/or manufacturer's 14 balance sheet.

In step 104, the customer 16 places purchase orders directly with the owner 12. In step 105 the owner forecasts the customer's inventory needs based on the customer purchase orders, and other information such as preexisting supply agreements transferred from the manufacturer 14, and places procurement orders directly with the manufacturer. In step 106, the ordered goods are picked up by the logistics agent 18 from the manufacturer, are delivered to the proximity hub 22 and are held at the proximity hub until needed. Upon reaching the proximity hub, title to the goods passes to the owner 12, which then bears the inventory risks. In step 107, payment is made to the manufacturer 14 by the owner 12 for the goods received, removing the inventory as a liability from the manufacturer's balance sheet and producing immediate cash flow for the manufacturer.

After each customer purchase order, the logistics agent obtains the specific goods ordered and in step 108 delivers the goods from the proximity hub to the customer 16. Preferably, title (and hence the risk) passes from the owner 12 to the customer 16 once the goods physically leave the proximity hub. In step 109, the cost of the inventory and the logistics services are billed to the customer 16 by the owner 12 on a periodic basis, as per the prior agreements. Preferably, the cost of the inventory billed to the customer 16 is more than a discounted cost paid for the inventory to the manufacturer 14. Note that the discount could also be expressed as a service fee paid to the owner 12 for its services under the system 10 or bundled with the logistics services bill, or in some other benefit accrued to the owner.

With respect to the forecasting step 105, the timing and amount of the owner 12's purchase of the goods from the manufacturer 14 is based upon a combination of retail sales forecasts by the customer 16 and purchase orders from the customer. The product forecasts serve as long-term projections of the customer's goods requirements for periods greater than 90 days. Purchase orders, on the other hand, serve as short-term projections of goods requirements for periods less than 90 days. Cancelable and non-cancelable purchase orders are used to establish the timing of procurement orders. The requirements of the non-cancelable purchase orders are used to determine a minimum fulfillment rate and period, as well as pricing and payment terms for the goods.

Figure 3:
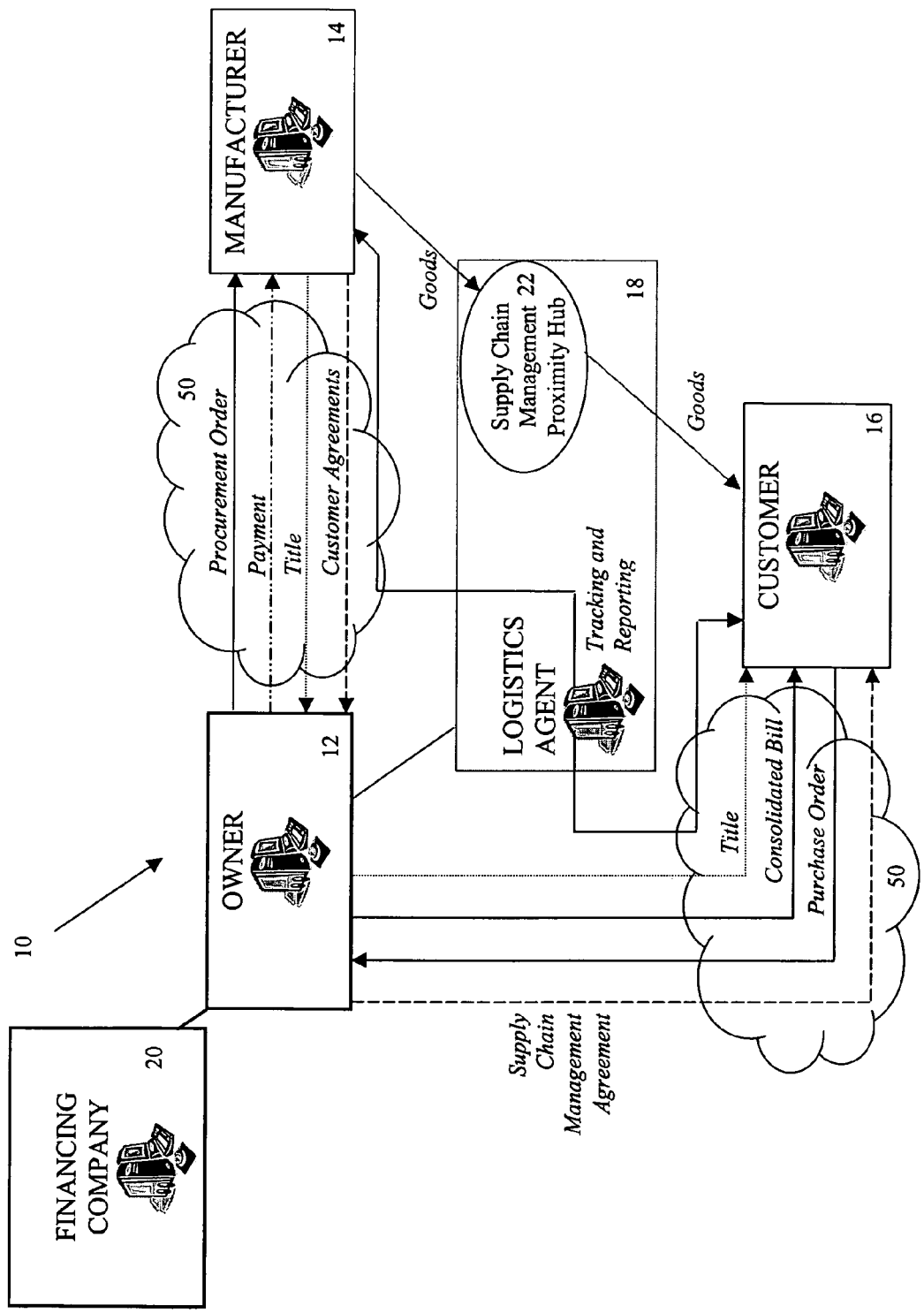
FIG. 3 is a schematic of a supply chain and inventory risk management system of yet another embodiment of the present invention interconnected via a network.

In another embodiment of the present invention the owner 12, manufacturer 14, customer 16, logistics agent 18 and financing entity 20 each includes an electronic system such as a computer, server or some combination of a processing element and a database, or a collection or combination thereof, connected via a network 50, such as over the Internet, as shown in FIG. 3. Such electronic interconnection between the entities allows for electronic execution of many of the functions necessary to implement the management system 10. For instance, the customer agreements, in the form of electronic files, can be transmitted via the network 50 from the manufacturer 14's server to the owner 12's server, allowing the owner to gain complete access to all of the terms and condition necessary that must be met to fulfill its obligations to the customer 16. Further, the owner 12 may negotiate additional supply chain management agreements, or modify the preexisting customer agreements, through the exchange of agreement drafts between its server and the customer 16's server.

Interconnection via the network 50 can also be used to facilitate the aspects of the system 10 dealing with specific inventory transactions. For instance, the customer 16's server may be used to generate and transmit the purchase order forms over the network 50 to the owner 12's server. Generation of the purchase order forms could include generation of graphical user interfaces, such as web pages, that prompt and record input of the amount and type of inventory goods being ordered by the customer 16. Alternatively, employees of the customer 16 could connect over the Internet directly to the owner 12's server which generates the purchase order forms and records the order information via a browser on a personal computer.

The owner 12's server could also include software configured to collect a certain number of the purchase order forms and extract the information from the order forms needed to forecast an amount and timing of its next procurement order. Once the owner 12's server generates the procurement order, the procurement order is transmitted over the network 50 to the manufacturer 14's server for processing into specific work orders requesting manufacture of the inventory. Software could also be included on the owner 12's server to perform more complex needs forecasting, such as is described herein above, including short-term and long-term forecasting.

Exchange of title and payment funds could also be facilitated by the network connected embodiment of the system 10. Electronic title to the inventory, such as an electronic form with a digital signature or a scanned copy of the bill-of-lading that accompanies the physical goods, can be transmitted from the manufacturer 14's server to the owner 12's server for storage on a database. When the inventory is distributed by the owner to the customer 16 the electronic title can be transmitted again from the owner 12's server to the customer's server over the network 50. Funds transfer may also occur over the network 50, but the network would most likely be a separate network from that used for communication due to the need for security. For instance, the owner 12's server may be associated with an owner bank account from which it transfers funds via wire over a secure banking network 50 to the manufacturer 14's account. The customer 16 may pay the owner 12 in similar manner after receiving an electronic consolidated bill sent over the network 50 to its server.

The logistics agent 18 has its own server on which is stored information relating to the tracking of the inventory shipments, and other supply chain management information. The logistics agent 18's server can transmit the tracking, and other information related to physical holding, handling and delivery of the inventory goods, in reports to the manufacturer 14 and customer 16 servers. This tracking information may also be used in determining when title to inventory has transferred, especially when transfer is based on physical location, such as arrival of the goods at the hub 22, or at the customer 16's location.

FIGS. 1-3 are block diagrams, flowcharts and control flow illustrations of methods, systems and program products according to the invention. It will be understood that each block or step of the block diagram, flowchart and control flow illustration, and combinations of blocks in the block diagram, flowchart and control flow illustration, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustration support combinations of means for performing the specified functions, combinations of steps for performing the specified functions and program instruction means for performing the specified functions. It will also be understood that each block or step of the block diagram, flowchart or control flow illustration, and combinations of blocks or steps in the block diagram, flowchart or control flow illustration, can be implemented by special purpose hardware-based computer systems which perform the specified functions or steps, or combinations of special purpose hardware and computer instructions.

Advantageously, the system 10 transfers much of the inventory risk from the manufacturer 14 and the customer 16 to the owner 12. In the illustrated embodiment, the owner 12 assumes the depreciation, obsolescence and other risks associated with the electrical components. Further, the owner 12 assumes the risk of failing to fulfill the transferred agreements or any subsequent agreements or orders. In addition, the owner 12 is responsible for the credit risk if the customer 16 defaults on extended credit, or fails to pay for the inventory or services. The owner 12 is also transferred the risks of shrinkage, damage or destruction of the electronic components. In instances where the price paid for the components is variable under the customer agreements, such as in relation to prevailing market prices, then the owner 12 assumes some of the risk of market price fluctuations. Some risks remain with the manufacturer 14, however, such as the risk of non-performance of the electrical components as defined in various manufacturer and other warranties. Further, product liability risk still adheres all of the parties in the supply chain based on various product liability laws. The distribution of risks, however, may be adjusted depending upon the type of inventory and the desires of the various parties to the transactions, such as by modifying the point at which title passes between the manufacturer 14, owner 12 and the customer 16 or by providing for indemnification under the agreements.

Beyond removing inventory from the manufacturer 14 and customer 16 balance sheet the present invention has other advantages including, but not limited to, adding certainty to the demand for inventory goods, and the prices paid for those goods, through the transfer of customer agreements to the owner 12. In this manner, the owner is able to manage the inventory and maximize its return on the inventory, thereby allowing the owner to pay higher prices for the inventory purchased from the manufacturer 14. This is especially true for high-risk inventory which may be non-fungible, such as by being custom manufactured, and therefore not easily sold on open exchanges if not purchased by the customer 16. Instead, the customer is bound by the agreements to purchase the inventory goods, increasing the likelihood of purchase of the inventory and providing recourse to the owner 12 if the goods are not purchased. The use of a proximity hub 22, and the logistics agent 18 to manage the hub, ensures that the particular handling needs of the high-risk inventory are met to minimize breakage or obsolescence, further maximizing the amount and value of the inventory sold by the owner 12.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A supply chain and inventory risk management system for supplying inventory manufactured by a manufacturing entity to a plurality of customers, said management system comprising:

electronic customer agreements describing a plurality of customer agreement rights between the manufacturing entity and the customers wherein ownership of the customer agreement rights has been transferred to an owner entity separate from the manufacturing entity, said customer agreement rights requiring distribution of the inventory to the customers in agreed-upon amounts in exchange for agreed-upon payments; and an electronic owner computer system capable of receiving and storing the electronic customer agreements and of forecasting amounts and timing of the inventory needed to supply the customers using the agreed-upon amounts defined by the customer agreement rights and further capable of repeatedly receiving and storing title to the forecasted amounts of inventory from the manufacturer at the forecasted timing as the owner entity purchases and takes title to the forecasted amounts of inventory from the manufacturing entity at the forecasted timing; and said electronic owner system additionally capable of ordering distribution services for distributing the agreed-upon amounts of inventory to the customers in accordance with the customer agreement rights and also capable of receiving and recording the agreed-upon payments sent by the customers in exchange for the inventory wherein transfer of the customer agreement rights facilitates purchase of the agreed-upon amounts of inventory by the customers at the agreed-upon payments.

2. A management system of claim 1, wherein the forecasted amounts are larger than the agreed-upon amounts to be supplied to any one of the customers.

3. A management system of claim 1, wherein the customer agreement rights further require distribution of the inventory to the customers at agreed-upon times and wherein the electronic owner system is further capable of forecasting timing of purchases from the manufacturing entity using the agreed-upon times of the customer agreements.

4. A management system of claim 3, wherein the forecasted timing is more frequent than the agreed-upon times.

5. A management system of claim 3, wherein the forecasted timing is less frequent than the agreed-upon times.

6. A management system of claim 1, wherein the inventory is a high-risk inventory.

7. A management system of claim 6, wherein the high-risk inventory has any one of a plurality of high-risk characteristics including being damage prone, prone to obsolescence, perishable, fragile, sensitive to adverse environmental conditions or customized to suit the customers.

8. A management system of claim 6, wherein the high-risk inventory includes electronic components.

9. A management system of claim 1, wherein the electronic customer agreements include any one of purchase orders, contractual agreements, non-contractual agreements and forecasts of customer sales.

10. A management system of claim 1, wherein the electronic customer agreements include a supply chain management agreement which describes logistical requirements for storage and handling of the inventory.

11. A management system of claim 1, wherein the owner entity is a separate corporate entity from the customers.

12. A management system of claim 1, further comprising a financing entity capable of creating the owner entity and further capable of financing purchase of the inventory by the owner entity.

13. A management system of claim 12, wherein the owner entity is a subsidiary of the financing entity.

14. A management system of claim 1, wherein the owner entity further includes a logistics agent capable of managing distribution of the inventory to the customers as ordered by the electronic owner system.

15. A management system of claim 14, wherein the logistics agent is further capable of providing any one of freight forwarding, import/export brokerage and delivery services.

16. A management system of claim 14, wherein the logistics agent includes an electronic logistics system capable of providing inventory visibility services including reporting and tracking of inventory distribution.

17. A management system of claim 1, wherein the owner entity further includes a hub in geographical proximity to the customer and at which the owner entity is capable of taking physical possession of the inventory purchased from the manufacturer.

18. A management system of claim 1, wherein the agreed-upon payments are more per inventory unit than payments to the manufacturer facilitating profitable sale of the inventory by the owner entity to the customer.

19. A management system of claim 18, wherein the owner entity is further capable of taking physical possession to the inventory purchased from the manufacturer concurrent with the electronic owner system recording title to the inventory.

* * * * *